United States Patent
Ben-Avi

(10) Patent No.: US 12,067,388 B2
(45) Date of Patent: *Aug. 20, 2024

(54) UPDATING SOFTWARE ELEMENTS WITH DIFFERENT TRUST LEVELS

(71) Applicant: Mobileye Vision Technologies Ltd., Jerusalem (IL)

(72) Inventor: Eran Ben-Avi, Haifa (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,302

(22) Filed: Mar. 24, 2023

(65) Prior Publication Data

US 2023/0259355 A1 Aug. 17, 2023

Related U.S. Application Data

(63) Continuation of application No. 17/483,938, filed on Sep. 24, 2021.

(Continued)

(51) Int. Cl.
*G06F 21/57* (2013.01)
*G06F 8/65* (2018.01)

(Continued)

(52) U.S. Cl.
CPC ............... *G06F 8/65* (2013.01); *G06F 21/54* (2013.01); *G06F 21/575* (2013.01); *G06F 11/1417* (2013.01); *G06F 11/1433* (2013.01)

(58) Field of Classification Search
CPC .......... G06F 8/65; G06F 21/54; G06F 21/575; G06F 11/1417; G06F 11/1433
See application file for complete search history.

(56) References Cited

U.S. PATENT DOCUMENTS

| | | | |
|---|---|---|---|
| 9,507,581 B2 | 11/2016 | Butcher et al. | |
| 2009/0063108 A1* | 3/2009 | De Atley | G06F 21/577 |
| | | | 703/2 |

(Continued)

OTHER PUBLICATIONS

Nilo Redini et al., BootStomp: On the Security of Bootloaders in Mobile Devices, Aug. 16-18, 2017, [Retrieved on Mar. 20, 2024]. Retrieved from the internet: <URL: https://www.usenix.org/system/files/conference/usenixsecurity17/sec17-redini.pdf> 19 Pages (781-798) (Year: 2017).*

(Continued)

*Primary Examiner* — Anibal Rivera
(74) *Attorney, Agent, or Firm* — Banner & Witcoff Ltd.

(57) ABSTRACT

Techniques are disclosed for updating a trusted software and another software, which may include receiving a software update package that comprises a trusted updated software component, a trusted updated software booting metadata, another updated software component, and another updated software booting metadata. The trusted updated software component may belong to an updated version of the trusted software, and the trusted software may have a certain trust level. The other updated software component may belong to an updated version of the other software, and the other software may have a trust level that is lower than the certain trust level. At least a part of the trusted updated software booting metadata may comprise retrieval information for retrieving, during a booting process, at least a portion of the other software booting metadata.

24 Claims, 11 Drawing Sheets

Related U.S. Application Data

(60) Provisional application No. 63/085,354, filed on Sep. 30, 2020.

(51) Int. Cl.
*G06F 11/14* (2006.01)
*G06F 21/12* (2013.01)
*G06F 21/54* (2013.01)

(56) References Cited

U.S. PATENT DOCUMENTS

| | | |
|---|---|---|
| 2012/0233604 A1 | 9/2012 | Jibbe et al. |
| 2014/0026124 A1* | 1/2014 | Gilbert ............... G06F 8/65 717/124 |
| 2019/0340379 A1* | 11/2019 | Beecham ............ G06F 16/9014 |
| 2019/0347164 A1* | 11/2019 | Nightingale ........ G06F 11/1076 |
| 2019/0377644 A1 | 12/2019 | Kulkarni et al. |
| 2021/0176255 A1* | 6/2021 | Hill ...................... H04L 9/3234 |
| 2021/0312057 A1 | 10/2021 | Kloth |
| 2022/0100492 A1 | 3/2022 | Ben-Avi |

OTHER PUBLICATIONS

Franz-Josef Streit et al., Secure Boot from Non-Volatile Memory for Programmable SoC Architectures, Apr. 20, 2020, [Retrieved on Mar. 20, 2024]. Retrieved from the internet: <URL: https://arxiv.org/pdf/2004.09453.pdf> 9 Pages (1-9) (Year: 2020).*

Trishank Karthik et al., Uptane: Securing Software Updates for Automobiles, 2016, [Retrieved on Mar. 2, 2023]. Retrieved from the internet: <URL: https://uptane.github.io/papers/kuppusamy_escar_16.pdf> 11 Pages (1-11) (Year: 2016).

Franz-Josef Streit et al., Secure Boot from Non-Volatile Memory for Programmable Soc Architectures, Apr. 20, 2020, [Retrieved on Mar. 2, 2023]. Retrieved from the internet: <URL: https://arxiv.org/pdf/2004.09453.pdf> 9 Pages (1-9) (Year: 2020).

* cited by examiner

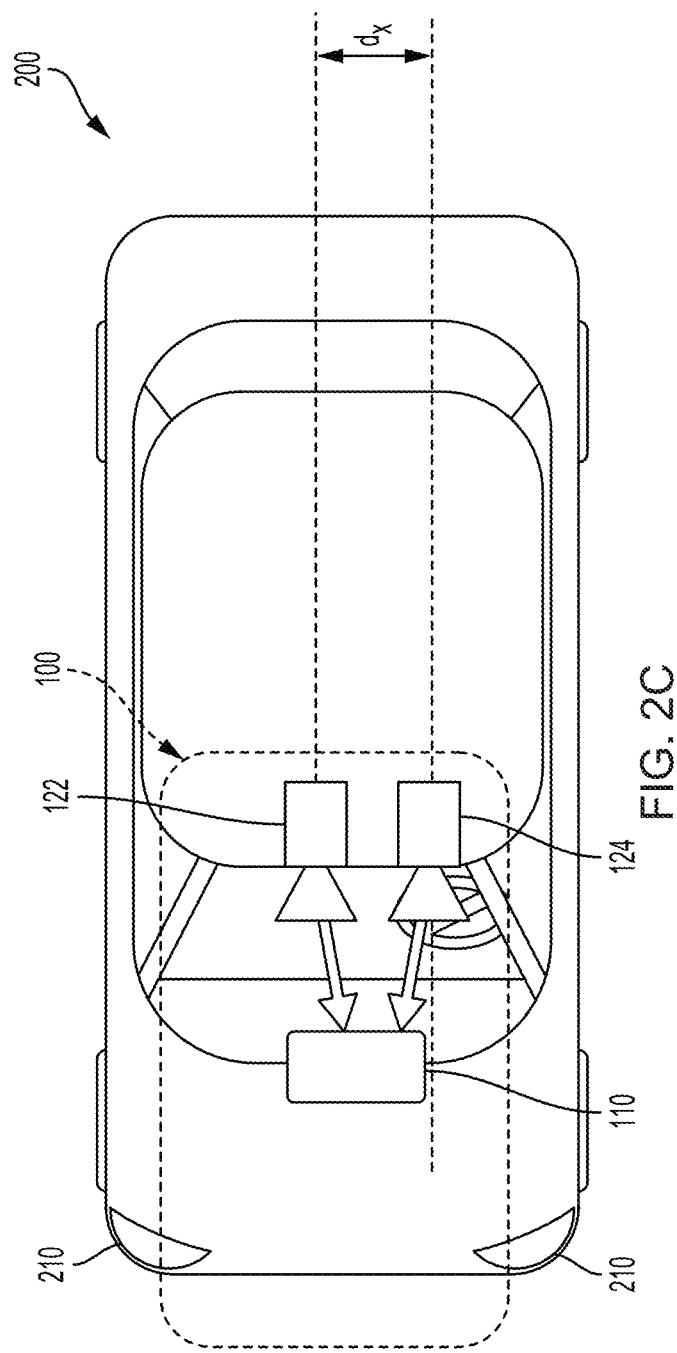

UPDATING SOFTWARE ELEMENTS WITH DIFFERENT TRUST LEVELS

CROSS-REFERENCE TO RELATED APPLICATIONS

The present application is a continuation application of U.S. Non-provisional application Ser. No. 17/483,938, filed Sep. 24, 2021, which issued as U.S. Pat. No. 11,726,767 on Aug. 15, 2023, and which claims the benefit of the filing date of U.S. provisional application No. 63/085,354, filed on Sep. 30, 2020, the contents of each of which are incorporated herein by reference in their entireties.

TECHNICAL FIELD

The disclosure relates to the technical field of software execution and, in particular, to techniques for updating software elements with different trust levels.

BACKGROUND

Advanced driver assistance systems (ADAS) and autonomous vehicle (AV) systems use cameras and other sensors together with object classifiers, which are designed to detect specific objects in an environment of a vehicle navigating a road. Object classifiers are designed to detect predefined objects, and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

Techniques are disclosed for updating a trusted software and another (i.e. "further") software, which may include receiving a software update package that comprises a trusted updated software component, a trusted updated software booting metadata, another updated software component, and another updated software booting metadata. The trusted updated software component may belong to an updated version of the trusted software, and the trusted software may have a certain trust level. The other updated software component may belong to an updated version of the other software, and the other software may have a trust level that is lower than the certain trust level. At least a part of the trusted updated software booting metadata may comprise retrieval information for retrieving, during a booting process, at least a portion of the other software booting metadata.

The embodiments described herein further implement storing, at different locations of at least one nonvolatile memory device, the trusted updated software component, the trusted updated software booting metadata, the other updated software component, and the other updated software booting metadata. The storing may be executed without overwriting a trusted current software component, a trusted current software booting metadata, another current software component, and another current software booting metadata. The trusted current software component may belong to a current version of the trusted software, and the other current software component may belong to a current version of the other software. The techniques discussed herein also include switching from the current version of the trusted software to the updated version of the trusted software, switching from the current version of the other software to the updated version of the other software, and invalidating the current trusted software booting metadata and the current other software booting metadata.

The disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW), traffic sign recognition (TSR), etc., as opposed to fully autonomous driving. In various embodiments, the system may include any suitable number of cameras mountable in a vehicle and an associated processor that monitors the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems and methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor, and the like.

As discussed in further detail herein, the disclosed embodiments may include a method, device, and a computer readable medium (e.g. a non-transitory computer readable medium) for updating software elements with different trust levels.

BRIEF DESCRIPTION OF THE DRAWINGS/FIGURES

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings in which:

FIG. 2C is a diagrammatic top view representation of another embodiment of a vehicle including a system consistent with the disclosed embodiments;

DETAILED DESCRIPTION

Figure 1:
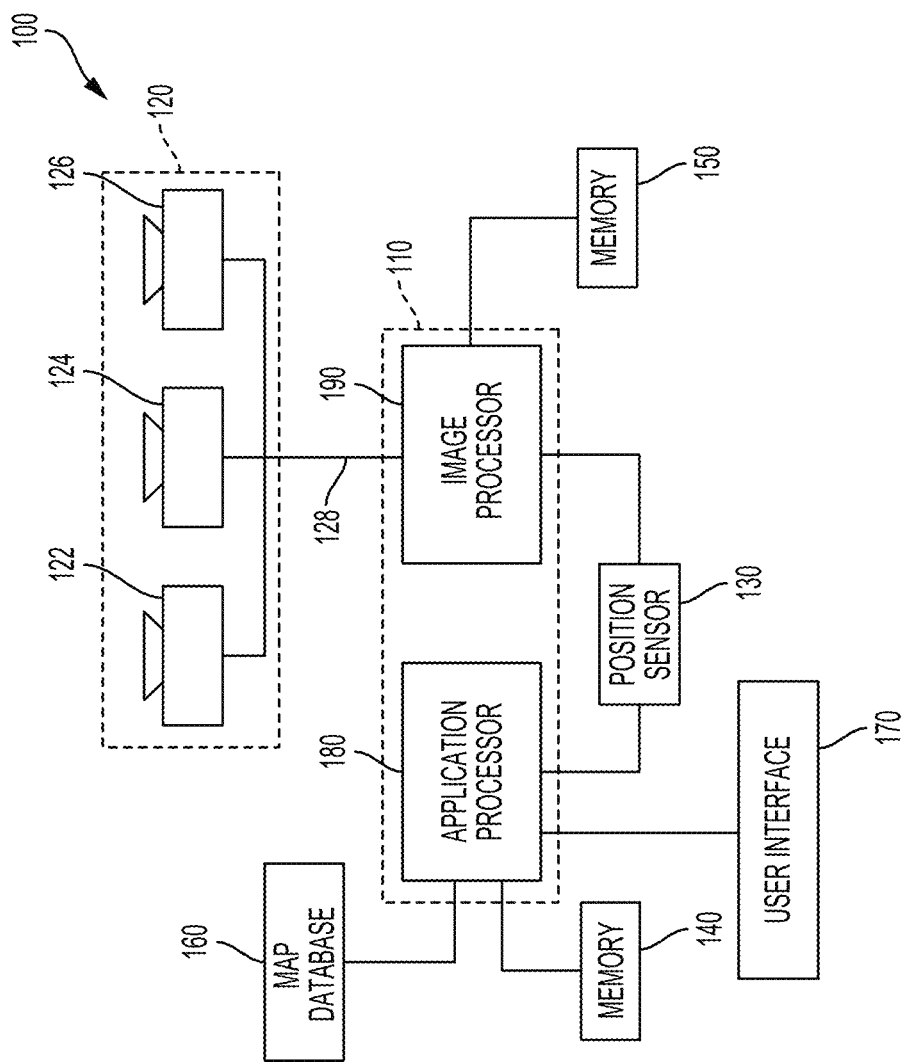
FIG. 1 is a block diagram representation of a system consistent with the disclosed embodiments.

The following detailed description refers to the accompanying drawings. Wherever possible, the same reference numbers are used in the drawings, and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

Section I—Vehicle Systems and Operation

FIG. 1, to which reference is now made, is a block diagram representation of a system consistent with the disclosed embodiments. System 100 can include various components depending on the requirements of a particular implementation. In some examples, system 100 may include a processing unit 110, an image acquisition unit 120 and one or more memory units 140, 150.

Processing unit 110 may be alternatively referred to herein as processing circuitry, and may include one or more processors or processing devices, software components, or combinations of these. In some embodiments, processing unit 110 may include an application processor 180, an image processor 190, or any other suitable processing device. Similarly, image acquisition unit 120 may be alternatively referred to herein as image acquisition circuitry, and may include one or more processors or processing devices, software components, or combinations of these. The image acquisition unit 120 may include any suitable number of processors or processing devices configured to perform image acquisition and/or components (which may include software-executable components) depending on the requirements of a particular application. In some embodiments, the image acquisition unit 120 may include or more image capture devices (e.g., cameras), such as image capture device 122, image capture device 124, and image capture device 126.

In some embodiments, the system 100 may also include a data interface 128 that is configured as any suitable type of hardware components, software components, or combinations of these that is configured to communicatively connect processing unit 110 to image acquisition unit 120. For example, the data interface 128 can include any suitable number of wired and/or wireless links, buses, terminals, ports, links for transmitting image data acquired by image acquisition unit 120 to processing unit 110, etc.

Both the application processor 180 and the image processor 190 may be implemented as any suitable number and/or type of processing devices. For example, either or both of the application processor 180 and the image processor 190 may be implemented as one or more microprocessors, preprocessors (such as image preprocessors), graphics processors, central processing units (CPUs), support circuits, digital signal processors, integrated circuits, memory, or any other type of devices suitable for running applications and for image processing and analysis. In some embodiments, the application processor 180 and/or the image processor 190 may include any suitable type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, the application processor 180 and/or the image processor 190 may be implemented as any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in the processing unit 110, embodiments include the processing unit 110 being implemented with any suitable number of processors and/or processing devices. For example, in some examples, a single processing device may be used to accomplish the tasks of the application processor 180 and the image processor 190. In other embodiments, these tasks may be performed by more than two processing devices.

Processing unit 110 may be implemented as any suitable type and/or number of devices. For example, processing unit 110 may be implemented as various devices, such as a controller, an image preprocessor, a central processing unit (CPU), support circuits, digital signal processors, integrated circuits, memory, or any other types of devices for image processing and analysis. The image preprocessor may include a video processor for capturing, digitizing, and processing the imagery from the image sensors. The CPU may be implemented with any number of microcontrollers or microprocessors. The support circuits may be any suitable number and/or type of circuits, including those that are well known in the art, including cache, power supply, clock, and input-output circuits, for instance.

The system 100 may include any suitable number of memory units, with two memory units 140, 150 being shown in FIG. 1 for purposes of brevity. The memory units 140, 150 may alternatively be referred to herein as a memory. The memory 140 and/or 150 may store software that, when executed by any suitable processor (such as one or more processors identified with the processing unit 110), controls the operation of the system 100. The memory 140 and/or 150 may include databases and/or image processing software, including a trained system, such as a neural network, for example. The memory 140 and/or 150 may include any suitable number of random access memories, read only memories, flash memories, disk drives, optical storage, removable storage, and any other suitable types of storage. In one example, the memory 140 and/or 150 may be separate from the processing unit 110. In another example, the memory 140 and/or 150 may be integrated into the processing unit 110.

Each of the memory 140, 150 may include software instructions (i.e. computer-readable and executable instructions) that when executed by a processor (e.g., application processor 180 and/or image processor 190), may control operation of various aspects of system 100. These memory units 140 and/or 150 may include various databases and image processing software. The memory units 140 and/or 150 may include random access memory, read only memory, flash memory, disk drives, optical storage, tape storage, removable storage, and/or any other types of storage. In some examples, memory units 140 and/or 150 are separate from the application processor 180 and/or image processor 190. In other embodiments, these memory units 140 and/or 150 may be integrated into the application processor 180 and/or the image processor 190.

In some embodiments, the system 100 may include a position sensor 130. The position sensor 130 may include any suitable type of device suitable for determining a location associated with at least one component of system 100. In some embodiments, the position sensor 130 may be implemented as a Global navigation satellite system (GNSS) receiver, such as a Global Positioning System (GPS) receiver for instance. Such receivers may determine a user position and velocity by processing signals broadcasted by GNSS satellites. Position information from position sensor 130 may be made available to the application processor 180 and/or the image processor 190.

In some embodiments, the system 100 may be operatively connectible to various systems, devices, and/or units onboard a vehicle in which the system 100 may be mounted. The various components of the system 100 may communicate with one another and/or the vehicle's various systems via any suitable number and/or type of interfaces (e.g., a communication bus. Examples of vehicle systems with which the system 100 may cooperate include a throttling system, a braking system, a steering system, etc.

In some embodiments, the system 100 may include a user interface 170. The user interface 170 may be implemented as any suitable type of device for providing information to or for receiving inputs from one or more users of system 100, including, for example. The user interface 170 may be implemented as, for instance, a touchscreen, microphone, keyboard, pointer devices, track wheels, cameras, knobs, buttons, etc. Information may be provided by the system 100 to the one or more users of the system 100 via presentation through the user interface 170.

In some embodiments, the system 100 may include a map database 160. The map database 160 may be implemented as any suitable type of database for storing digital map data. In some examples, map database 160 may include data relating to a position, in a reference coordinate system, of various items, including roads, water features, geographic features, points of interest, etc. Map database 160 may store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, the map database 160 may be physically located with other components of system 100. Alternatively or additionally, map database 160 or a portion thereof may be located remotely with respect to other components of system 100 (e.g., remote to the processing unit 110). In such embodiments, information from the map database 160 may be downloaded over a wired and/or wireless data and in accordance with any suitable number and/or type of communication protocols (e.g., over a cellular network and/or the Internet, etc.).

The image capture devices 122, 124, and 126 may each be implemented as any type of device configured to capture at least one image from an environment. Moreover, any suitable number of the image capture devices 122, 124, and 126 may be implemented by the system 100 to acquire images, which may then be input to the image processor 190. Some embodiments of the presently disclosed subject matter may be implemented with a single-image capture device, while other embodiments may be implemented with two, three, or even four or more image capture devices. The image capture devices 122, 124, and 126 are further described below with reference to FIGS. 2B-2E.

The system 100 may implement or be work in conjunction with any suitable number and/or type of sensors, including for example: an acoustic sensor, a RF sensor (e.g., radar transceiver), a LIDAR sensor, etc. Such sensors may be used independently of or in cooperation with the image acquisition unit 120. For example, data from the radar system (not shown) may be used for validating the processed information that is received from processing images acquired via the image acquisition unit 120, e.g., to filter certain false positives resulting from processing images acquired by the image acquisition unit 120. Alternatively, data from a radar system (not shown) may be combined with or otherwise compliment the image data from the image acquisition unit 120, or some processed variation or derivative of the image data from the image acquisition unit 120.

Figure 2A:
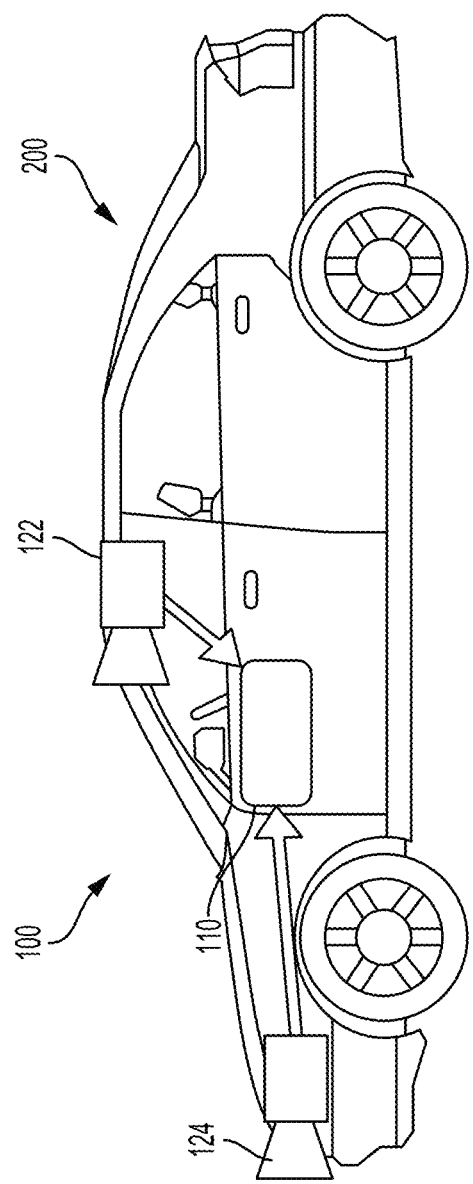
FIG. 2A is a diagrammatic side view representation of an exemplary vehicle including a system consistent with the disclosed embodiments.

System 100, or various components thereof, may be incorporated into any suitable number and/or type of different platforms. In some embodiments, system 100 may be implemented as part of a vehicle 200, as shown in FIG. 2A. For example, vehicle 200 may be equipped with a processing unit 110 and any of the other components of system 100, as described above with reference to FIG. 1. While in some embodiments vehicle 200 may be equipped with only a single-image capture device (e.g., camera), in other embodiments, such as those discussed in connection with FIGS. 2B-2E, multiple image capture devices can be used. For example, either of the image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3, image capture device 122 may be located in the vicinity of the rearview mirror. This position may provide a line of sight similar to that of the driver of vehicle 200, which may aid in determining what is and is not visible to the driver.

Other locations for the image capture devices of image acquisition unit 120 may also be used. For example, the image capture device 124 may be located on or in a bumper of vehicle 200. Such a location may be especially advantageous for image capture devices having a wide field of view. The line of sight of bumper-located image capture devices may be different from that of the driver. The image capture devices (e.g., the image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and may not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponds to a sector which covers an area of a road ahead of a vehicle and possibly also surroundings of the road.

In addition to the image capture devices, the vehicle 200 may include any components of system 100, although not every component of the system 100 is shown for purposes of brevity. For example, the processing unit 110 may be included on vehicle 200 either integrated with or separate from an engine control unit (ECU) of the vehicle. Vehicle 200 may also be equipped with a position sensor 130, such as a GNSS receiver, and may also include a map database 160 and memory units 140 and 150.

Figure 2B:
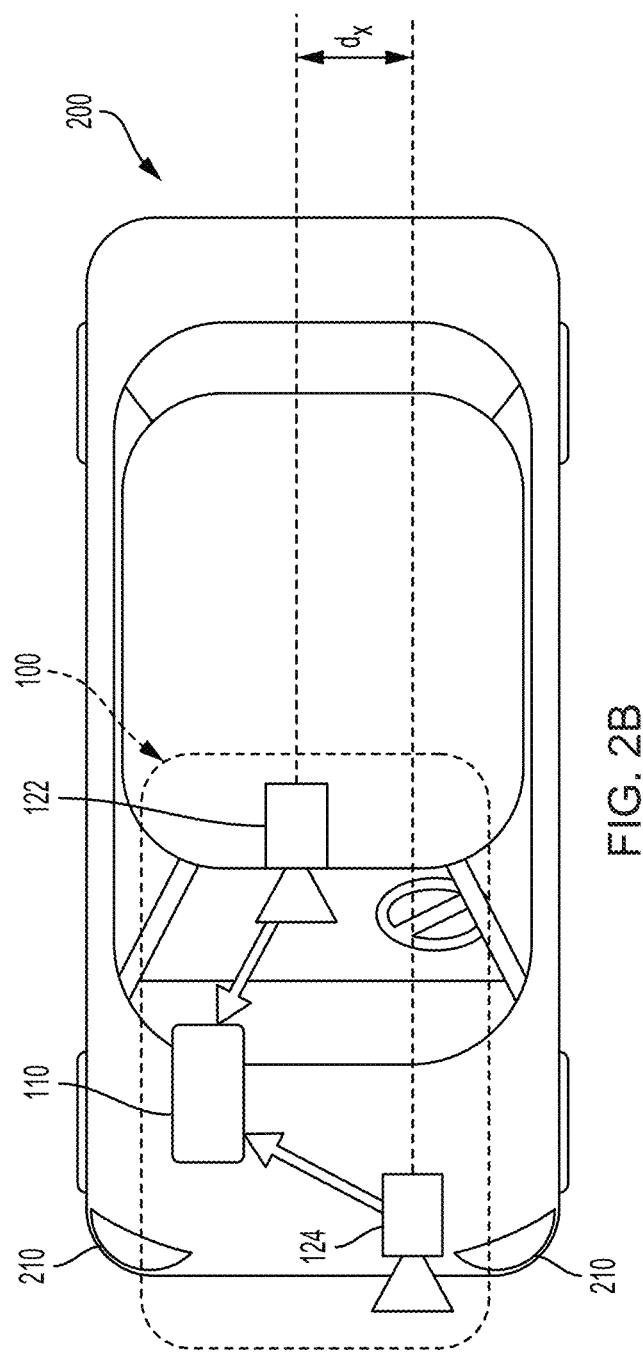
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples may include a vehicle 200 including in its body the system 100 with the first image capture device 122 positioned in the vicinity of the rearview mirror and/or near the driver of vehicle 1200, the second image capture device 124 positioned on or in a bumper region (e.g., one of bumper regions 1210) of vehicle 200, and the processing unit 110.

As illustrated in FIG. 2C, the image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of the vehicle 200.

Figure 2D:
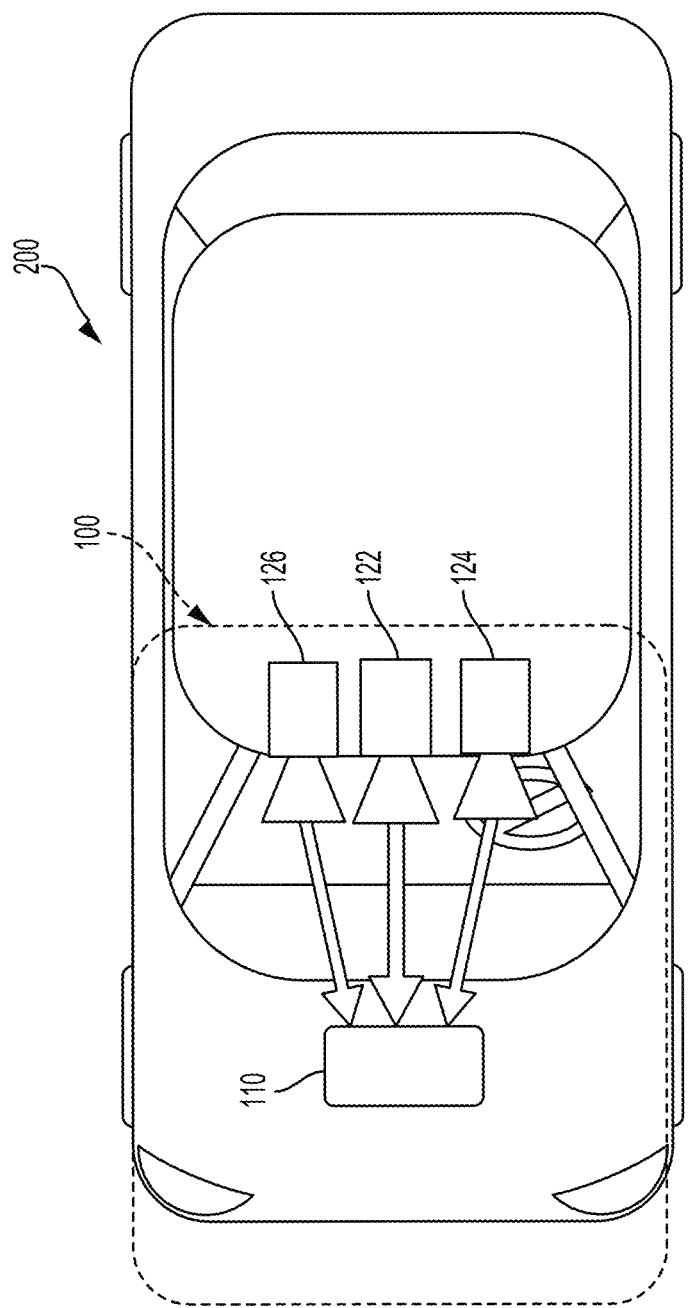
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that the disclosed embodiments are not limited to a particular type of vehicle 200, and may be applicable to all types of vehicles including automobiles, trucks, trailers, motorcycles, bicycles, self-balancing transport devices and other types of vehicles.

The first image capture device 122 may include any suitable type of image capture device. The image capture device 122 may include an optical axis. In one instance, the image capture device 122 can include an Aptina M9V024 WVGA sensor with a global shutter. In another example, a rolling shutter sensor may be implemented. The image acquisition unit 120, and any image capture device which is implemented as part of the image acquisition unit 120, may have any suitable image resolution. For example, the image capture device 122 may provide a resolution of 1280×960 pixels and can include a rolling shutter.

The image acquisition unit 120, and any image capture device which is implemented as part of the image acquisition unit 120, can include various optical elements. In some embodiments, one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120, may include or be associated with any optical elements, such as a 6 mm lens or a 12 mm lens, for example. In some examples, image capture device 122 may be configured to capture images having a desired (and predetermined) FOV.

The first image capture device 122 may have a scan rate associated with acquisition of each of a first series of image scan lines. The scan rate may refer to a rate at which an image sensor may acquire image data associated with each pixel included in a particular scan line.

Figure 2E:
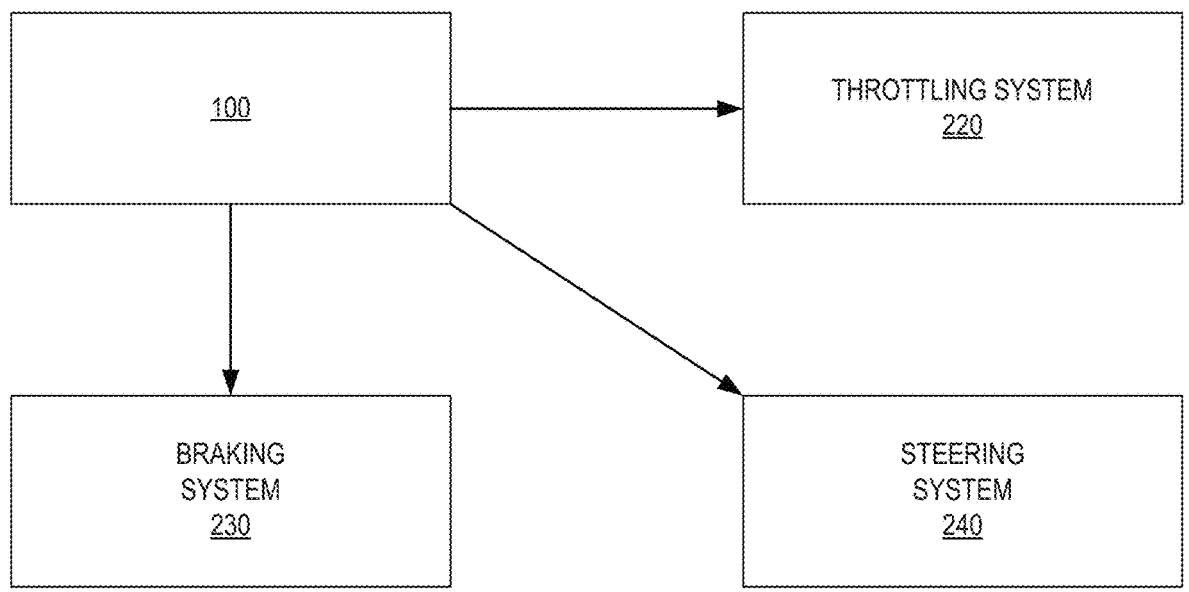
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 may include a throttling system 220, a braking system 230, and a steering system 240. The system 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, the system 100 can provide control signals to one or more of throttling system 220, braking system 230, and steering system 240 to navigate vehicle 1200 (e.g., by causing an acceleration, a turn, a lane shift, etc.). Further, the system 100 may receive inputs from one or more of the throttling system 220, the braking system 230, and the steering system 240 indicating operating conditions of vehicle 200 (e.g., speed, whether vehicle 200 is braking and/or turning, etc.).

Figure 3:
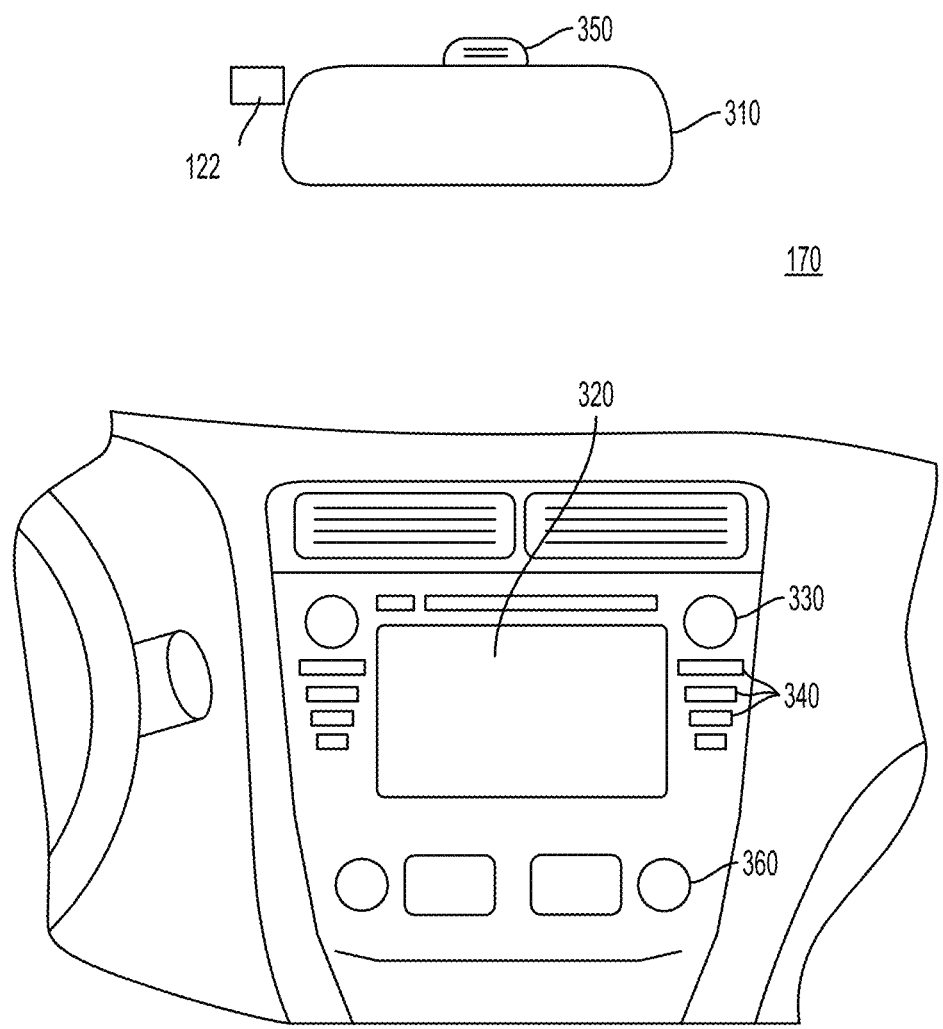
FIG. 3 is a diagrammatic representation of an interior of a vehicle including a rearview mirror and a user interface for a vehicle imaging system consistent with the disclosed embodiments.

As shown in FIG. 3, the vehicle 200 may also include a user interface 170 for interacting with a driver or a passenger of vehicle 200. For example, the user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with the system 100. In some embodiments, microphone 1350 may be positioned adjacent to a rearview mirror 1310. Similarly, in some embodiments, the image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, the system 100 may provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with the vehicle 200. Navigation, control, and/or operation may alternately or additionally include interaction with a user, driver, passenger, passerby, and/or other vehicle or user, which may be located inside or outside the vehicle 200, for example by providing visual, audio, haptic, and/or other sensory alerts and/or indications.

As discussed below in further detail and consistent with various disclosed embodiments, the system 100 may provide a variety of features related to autonomous driving, semi-autonomous driving and/or driver assist technology. For example, the system 100 may analyze image data, position data (e.g., GNSS location information), map data, speed data, and/or data from sensors included in vehicle 200. The system 100 may collect the data for analysis from, for example, the image acquisition unit 120, the position sensor 130, and any other suitable sensors. Further, the system 100 may analyze the collected data to determine whether or not vehicle 200 should take a certain action, and then automatically take the determined action without human intervention. It would be appreciated that in some cases, the actions taken automatically by the vehicle 200 are under human supervision, and the ability of the human to intervene, adjust, abort, or override the machine action is enabled under certain circumstances or at all times. For example, when the vehicle 200 navigates without human intervention, the system 100 may automatically control the braking, acceleration, and/or steering of vehicle 200 (e.g., by sending control signals to one or more of the throttling system 122, the braking system 123, and the steering system 124). Further, the system 100 may analyze the collected data and issue warnings, indications, recommendations, alerts, or instructions to a driver, passenger, user, or other person inside or outside of the vehicle 200 (or to other vehicles) based on the analysis of the collected data. Additional details regarding the various embodiments that are provided by system 100 are provided below.

Section II—Updating Software Components Having Different Trust Levels

A. Booting

When a computer or other suitable processing component (e.g. the processing unit 110 of the system 100 discussed in Section I above) is turned off, its software-including operating systems, application code, and data-remain stored in a non-volatile memory. When the computer is powered on, the computer typically does not have an operating system or its loader stored in random-access memory (RAM). Thus, the computer first executes a relatively small program stored in the read-only memory (ROM), along with a small amount of needed data to access one or more nonvolatile memory devices, from which the operating system programs and data can be loaded into RAM.

The small program that starts this sequence is known as a "bootstrap loader," "bootstrap," or "boot loader." This program's only job is to load other data and programs, which are then executed from RAM. Often, multiple-stage boot loaders are used, during which several programs of increasing complexity load one after the other in a process referred to as chain loading.

The chain loading may include a first level boot loader, which may be used to load a second level boot loader, whereas the second level boot loader may be larger than the first level boot loader and may be used to load larger software components or larger software. For example, the second level boot loader may be used to load an operating system.

Different boot loaders may be stored in different nonvolatile memory devices or portions thereof. Moreover, it should be noted that a boot loader may provide access to different operating systems, to different versions of operating systems, and even to programs that may be executed in the absence of an operating system. The boot process is considered complete when the computer is ready to interact with the user, or when the operating system is capable of running system or application programs.

B. Software Updates

Software is sometimes updated multiple times during a life span of a computerized system that executes the software. Non-limiting examples of software may include image processing software, AV software, and ADAS software, which may be implemented by the processing unit 110 of the system 100 as discussed above, for instance. Given the frequency of the software updates, such updates should be executed in an efficient and secure manner. Moreover, software updates may require updating the entirety of a software having one or more components stored in a non-volatile memory. The updating process of the one or more software components may require less bandwidth and less storage than updating of the entire software. For ease of explanation, the embodiments described in the current Section may reference updating a component of the software, although this is by way of example and not limitation, and the embodiments may equally apply to updating of the entirety of a software.

An update of a current software component (i.e. a software component of a current version) involves replacing the current software component with an updated software component (i.e. a software component of an updated version). This update should be executed in a manner that does not prevent the current software (i.e. software of a current version) from being operable until switching to the updated software with the updated software component. Accordingly—if, during the updating process, a system failure occurs, or an update is interrupted before switching to the updated software—the current software can still be used. Switching to the updated software occurs when one or more predefined conditions) are met. For instance, a condition may include the update being successfully completed. The switching may be executed in an atomic manner.

If the switching fails, then the system may continue to utilize the previous version of the software. The system may perform one or more attempts to switch to the updated software, may generate alerts or notifications when the switching fails, may limit the number of attempts, and the like.

The software component may be self-executable, and may include at least a component of an operating system, a kernel, a hypervisor, an application, an operation system stack, and the like.

During the update process, the updated software component is not written over the current software component. Thus, the management metadata, such as at least one boot loader (or boot loaders of various levels), may be updated to enable booting of the updated software after an occurrence of switching to the updated software.

There are cases in which the one or more nonvolatile memory devices are used to store different softwares, which may differ from one other by their respective trust levels. For instance, there may be two or more different trust levels, and the different software may include a first software that has a trust level that exceeds the trust level of a second software. The first software may be referred to as a "trusted" software, whereas the second software may be referred to herein as "another" software, a "further" software, or "other" software. A software may include different portions or parts. The entire software may thus be assigned a trust level that represents the lowest trust level of any of its constituent parts. Alternatively, different parts of the software may be updated independently from one another, and each independently-loaded software part may be treated according to its respective trust level.

The different trust levels may be allocated to the different software for various reasons, and the trust levels may be assigned in any suitable manner. For example, the trusted software may be more immune to cyber-attacks than the other (i.e. further) software. For example, the different softwares may be created by vendors of different trust levels, or the different softwares may undergo certifications and/or validations processes associated with different trust levels. As another example, the softwares may differ from one other by the amount of damage that can be caused if breached. As yet a further example, a trusted software may be developed by a vendor of a system on chip (SoC) that includes one of the nonvolatile memory devices, while the other (i.e. further) software may be developed by a party that may receive services from the SoC.

Having separate boot initiators for the trusted and other (i.e. further) software may increase the reliability of the booting process, especially when the trusted software is more trusted, as failures in the booting process of the other (i.e. further) software would not prevent the system from properly executing the trusted software. The first software may be executed, for example, when its execution does not depend on a successful booting of the second software. For example, the first software may be an operating system, and the second software may be an application from among multiple applications to be executed by a vehicle computer, such as the processing unit 110 as discussed in Section I above for instance. As another example, the first software may control one component or aspect of the vehicle 200, while the second software may control another component (for example a non-essential component) or another aspect of driving the vehicle 200.

In addition, the chances of successfully loading the updated second software to a random access memory increases by having at least a part of the trusted (i.e. first) updated software booting metadata include retrieval information for retrieving, during a booting process, at least a portion of the second software booting metadata.

In the following example embodiments described herein, the boot loaders may include at least one flash partition descriptor (FPD), and one or more boot headers that are pointed to by the at least one FPD. The one or more boot headers may include metadata regarding the different software components. For example, a boot header may include metadata regarding the location (e.g. addresses) of the software components in the one or more nonvolatile memory devices, the sizes of the software components, security measures, and/or cryptographic measures to be taken when retrieving and/or executing the software components, and the like.

To address nonvolatile memory device malfunctions, multiple copies of the current software and/or multiple copies of the boot headers and/or the FPD may be stored in the one or more nonvolatile memory devices. The FPD and/or the boot headers may enable the retrieval of at least some of the copies of the current software.

The available space of the one or more nonvolatile memory devices may be monitored to guarantee that, before an update of a software component is executed, there is enough available space in the one or more nonvolatile memory device to concurrently store the current program and the updated program (as well as the boot initiators).

The location of one or more FPDs may be predetermined or otherwise known in advance. There may be a single location, or there may be any suitable number of locations in which the FPDs may be stored. A boot loader that accesses the one or more FPDs is configured to access these one or more locations.

The locations of one or more boot headers may also be predetermined or otherwise known in advance (e.g. stored in one or more predefined locations). Alternatively, the locations of the one or more boot headers may be known only after the retrieval of an FPD that points to the one or more boot headers. In cases in which the one or more boot headers are stored in a predefined location, the update software package may not include an FPD.

For example, in some nonvolatile memory devices there is at least one predefined boot partition space in which a second or higher level boot loader and/or one or more boot headers may be found. As another example, a boot loader associated with the trusted software and/or one or more boot headers of the trusted software may be located in a predefined boot partition space. As yet another example, boot headers of the second software may be located outside the predefined boot partition space.

Other allocations of boot headers and/or FPDs may be provided. For example, all boot headers may be located in an unknown location (e.g. within a user area partition of the memory unit).

A software update of a software component may include writing the updated software component to a nonvolatile memory device, writing an updated flash partition descriptor, and writing updated boot headers that will enable the retrieval of the updated flash partition during a boot sequence, after switching to the updated software that includes the updated software component, and the like.

C. A Process Flow for Updating Software Elements with Different Trust Levels

Figure 4:
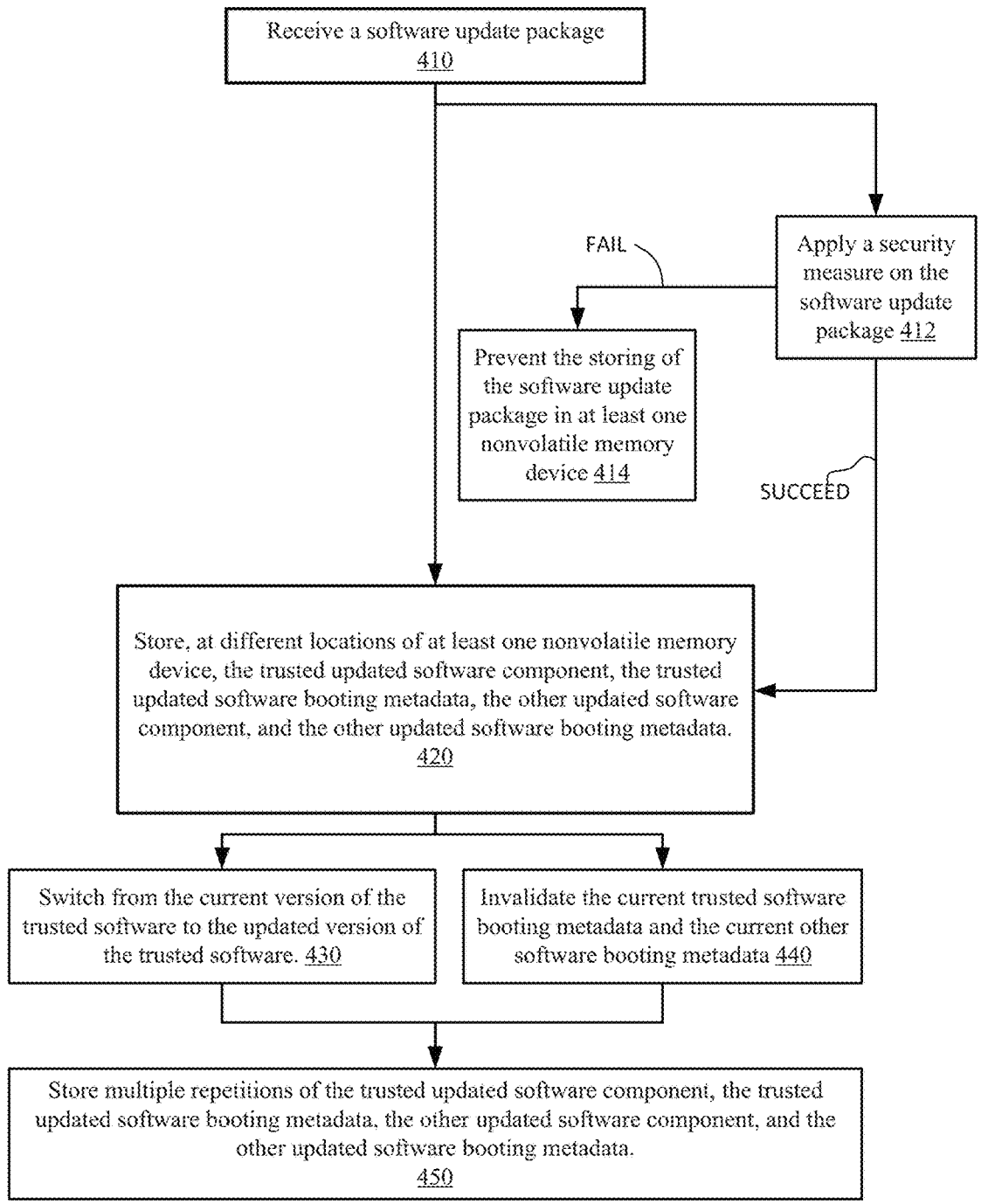
FIG. 4 illustrates an example of a method consistent with the disclosed embodiments.
Figure 5:
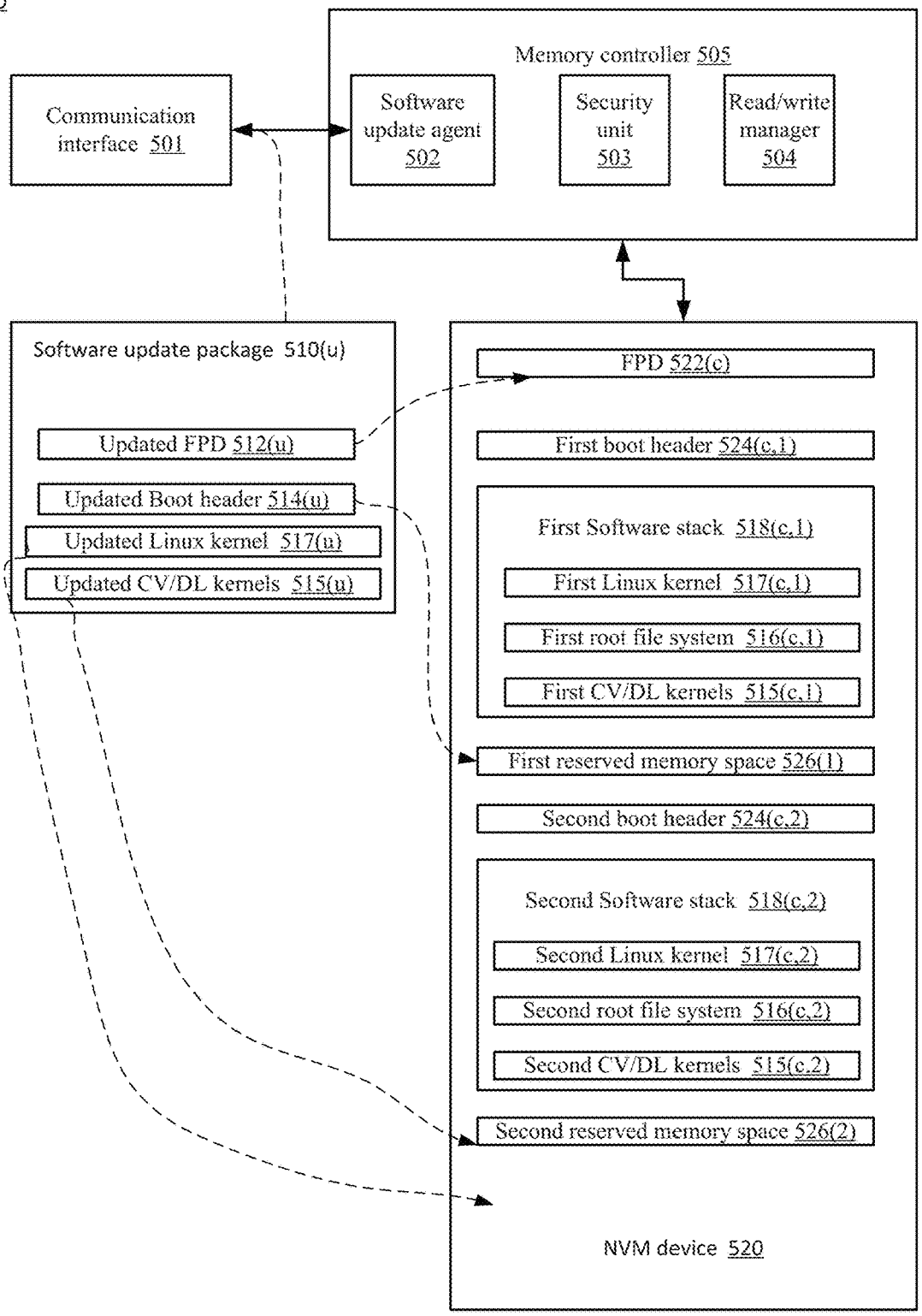
FIG. 5 illustrates an example system for receiving a software update package to update a nonvolatile memory device consistent with the disclosed embodiments.

FIG. 4 illustrates a process flow 400. With reference to FIG. 4, the process flow 400 may be a computer-implemented method executed by and/or otherwise associated with one or more processors (processing circuitry) and/or storage devices (e.g. non-volatile memories or other suitable types of memory). These processors and/or storage devices may be associated with one or more computing components identified with any suitable device, such as an SoC, an IC, the processing unit 110, the various processing entities identified with the system 100 and/or the vehicle 200 as discussed above with respect to Section I, etc. Thus, the process flow 400 may be implemented via execution of instructions stored in any suitable type of non-transitory computer readable medium via one or more processors, processing circuitry, etc. As another example, this may include the execution of instructions stored in the memory controller 505 via processing circuitry that may be integrated as part of the memory controller 505 or other suitable processing components, as shown and discussed in further detail herein with respect to FIG. 5, the instructions being implemented as part of the various modules of the memory controller 505 as shown in FIG. 5.

The processors as discussed herein may execute instructions stored on other computer-readable storage mediums such as the memory controller 505, the memories 140, 150 or, alternatively, stored on memories not shown in the Figures (which may be locally-stored instructions and/or as part of the processing circuitries themselves). The process flow 400 may include alternate or additional steps that are not shown in FIG. 4 for purposes of brevity, and may be performed in a different order than the steps shown in FIG. 4.

The process flow 400 may begin by one or more processors receiving (block 410) a software update package. As discussed herein, the software update package may include a trusted (i.e. first) updated software component, a trusted (i.e. first) updated software booting metadata, another (i.e. further or second) updated software component, and another (i.e. further or second) updated software booting metadata. It should be noted that there may be more than one trusted updated software, there may be more than one other updated software, and that the different software may be associated with any suitable number of trust levels, which may be more than two trust levels. For instance, as described herein, a trusted (i.e. first) software is more trusted than the other (i.e. "another," second," or "further") software. The further software may be more trusted than an additional (e.g. third) software. For ease of explanation, the following text refers to a trusted software component as a first software component, and to another (or "other") software component, which may alternatively be referred to as a second or further software component, and which may have trust level that is less than that of the first or trusted software component.

In an embodiment, the trusted updated software component belongs to (i.e. is identified with) an updated version of the trusted software, and the trusted software has a certain (e.g. predetermined) trust level. The other updated software component belongs to an updated version of the other software. The other software has a trust level that is lower than the predetermined trust level associated with the trusted software component. At least a portion of the trusted updated software booting metadata may include retrieval information for retrieving, during a booting process, at least a portion of the other software booting metadata. The trusted updated software booting metadata may include public keys for authenticating the other software and/or for authenticating the other software booting metadata. Any other suitable security metadata for verifying and/or authenticating the other software and/or for authenticating the other software booting metadata may be at least partially included in the trusted updated software booting metadata and/or be retrieved based on retrieval information included in the trusted updated software booting metadata.

Step 410 may be followed by storing (block 420), at different respective locations of at least one nonvolatile memory device (e.g. the non-volatile memory devices 520, 650 as discussed in further detail in this Section, or another suitable non-volatile memory device that may not be shown in the Figures), the trusted updated software component, the trusted updated software booting metadata, the other updated software component, and the other updated software booting metadata.

In an embodiment, the storing (block 420) may be executed without overwriting the trusted current software component, the trusted current software booting metadata, the second or further current software component, and the second or further current software booting metadata. The trusted current software component may belong to (i.e. be identified with) a current version of the trusted software. The other current software component may belong to (i.e. be identified with) a current version of the other software.

Step 420 may be followed by switching (block 430) from the current version of the trusted software to the updated version of the trusted software. Additionally or alternatively, step 420 may be followed by switching (block 430) from the current version of the other software to the updated version of the other software. This latter step is not shown in FIG. 4, but may be executed as part of the step 430 or as an additional step that occurs in parallel with step 430, prior to step 430, or after step 430. In any event, the act of switching from the current version of the trusted software to the updated version of the trusted software, as well as the act of switching from the current version of the further software to the updated version of the further software, may each be performed, respectively, in response to receiving a suitable instruction. This instruction may be transmitted to a device identified with execution of the software, such as the NVM devices 520, 650, for instance, as discussed herein with reference to FIGS. 5, 6A, and 6B. The instruction may be transmitted, for instance, via the memory controller 505 or other suitable device to facilitate this switching, and may represent any suitable type of instruction that is recognized by the relevant device for this purpose.

The step 420 may be followed by invalidating (block 440) the current trusted software booting metadata and the current other software booting metadata. The invalidation (block 440) may be followed by freeing of memory spaces (e.g. a range of memory addresses) that store the current trusted software booting metadata, the current other software booting metadata, and any suitable components of the current trusted software and the current other software that are irrelevant, i.e. that were replaced by updated software components.

A freeing (also referred to as releasing) of the non-volatile memory may additionally or alternatively include marking the addresses used for storing the information as useable, thereby allowing for an overwriting of the data that is stored at those address locations.

In an embodiment, at least part of the updated software metadata may include boot headers that point to at least a part of the other software booting metadata. The trusted updated software component may include one or more trusted software partition descriptors and one or more trusted software boot headers. The other updated software component may include one or more other software partition descriptors and one or more other software boot headers.

According to one example, one or more trusted software boot headers are stored in a predefined location (for example a known or predetermined partition and/or address range of the at least one nonvolatile memory device) that is known to a boot locator, which is configured to access one or more trusted software boot headers. The boot locator may be configured to obtain the one or more trusted software boot headers at a predefined location (for example a known or predetermined partition and/or address range of the at least one nonvolatile memory device) where the one or more trusted software boot headers are stored. Further continuing this example, the trusted updated software component may include one or more trusted software boot headers, and may be implemented without any trusted software partition descriptors.

Step 420 may include storing the trusted updated software component and the other updated software component in different partitions of the at least one nonvolatile memory device.

Step 410 may optionally be followed by applying (block 412) a security measure on the software update package. The application (block 412) of the security measure may be followed by preventing (block 414) the storing of the software update package in the at least one nonvolatile memory device. The security measure may be, for instance, indicative of a security breach. Otherwise, if the application of the sectary measure succeeds (e.g. a security breach is not detected), then application (block 412) of the security measure may be followed by the storing (block 420), at different respective locations of at least one nonvolatile memory device, the trusted updated software component, the trusted updated software booting metadata, the other updated software component, and the other updated software booting metadata.

In an embodiment, the steps 430 and 440 may be followed storing (block 450), in the at least one nonvolatile memory device multiple repetitions of the trusted updated software component, the trusted updated software booting metadata, the other updated software component, and the other updated software booting metadata. This may include, for instance, storing one or more copies of the trusted updated software component, the trusted updated software booting metadata, the other updated software component, and the other updated software booting metadata in respective locations (e.g. address ranges) of the non-volatile memory as discussed herein.

The storing (block 420) of the trusted updated software booting metadata may include storing the trusted updated software booting metadata in a reserved location positioned between (a) a first memory range allocated to a first current software component boot header and to a first current software component, and (b) a second memory range allocated to a second current software component boot header and to a second current software component.

The storing (block 420) of the trusted updated software booting metadata in the reserved location may be followed (after step 430) with storing (e.g. in block 450 or as a separate step not shown in FIG. 4), in the second memory range, the updated software component. This arrangement places the updated software component in proximity to the trusted updated software booting metadata and shortens the pointers from the trusted updated software booting metadata to the trusted updated software booting metadata.

D. Systems and Devices for Updating Software Elements with Different Trust Levels FIG. 5 illustrates an example system for receiving a software update package to update a nonvolatile memory device consistent with the disclosed embodiments. As shown in FIG. 5, the system 500 includes a communication interface 501 configured to receive an updated software package 510(u), a memory controller 505, and a nonvolatile memory device ("NVM device") 520. The updated software package 510(u) may be identified with, for instance, trusted and/or further (i.e. second or other) updated software components as discussed herein.

The communication interface 501 may be communicatively coupled to the memory controller 505, and the memory controller 505 may in turn be communicatively coupled to the NVM device 520. The communication interface 501 may be implemented as any suitable type of interface configured to transfer data to and/or from the memory controller 505 in accordance with any suitable data rate and/or communication protocol. For instance, the communication interface 501 may be implemented as any suitable number and/or type of wired and/or wireless links, networks, buses, interconnections, ports, etc. Moreover, the communication interface 501 may be configured to transfer data to and/or from another suitable computing device in accordance with any suitable data rate and/or communication protocol to receive the software update package 510(u). This may include, for instance receiving the software update package 510(u) over any suitable type of wired and/or wireless links, networks, buses, interconnections, ports, etc. The software update package 510(u) may be provided in this manner by any suitable type of computing device to perform a software update. For instance, the computing device providing the software update package 510(u) may be a personal computer, a cloud-based computer, a computer identified with the vehicle 200 or other system that implements the software to be updated (e.g. the processing unit 110), etc.

The memory controller 505 may be implemented as any suitable type of processors, digital circuitry, executable code, or combinations of these that manage the flow of data going to and from the NVM device 520. The memory controller 505 may be implemented as a separate chip from the NVM device 520 or integrated into the NVM device 520, in various embodiments. The memory controller 505 may be placed on the same die or as an integral part of a microprocessor (e.g. as an integrated memory controller (IMC)). In any event, the memory controller 505 is configured to control the nonvolatile memory device 520 and may control the software update process as discussed herein.

The memory controller 505 may include a security unit 403, which may be implemented as one or more processors, processing circuitry, one of more portions of the microprocessor in which the memory controller 505 is implemented, executable instructions, or combinations of these. The security unit 403 is configured to apply any suitable type of security means (including authentication, decryption, and the like) to the software update package 510(u), and may prevent the storing of the software update package 510(u) in the nonvolatile memory device 520 if the security measure indicates that the software update package 510(u) may be compromised, is not validated, or the like. Thus, the security unit 403 may implement the steps 412, 414 as discussed above with respect to FIG. 4.

The memory controller 405 may also include a software update agent 402, which may be implemented as one or more processors, processing circuitry, one of more portions of the microprocessor in which the memory controller 505 is implemented, executable instructions, or combinations of these. The software update agent 402 is configured to coordinate the reception of the software update package 510(u) and the provisioning of the software update package 510(u) to the security unit 503 and/or to the read/write manager 504 for writing the software update package 510(u) to the nonvolatile memory device 520.

It should be noted that the any updated software component of the software update package 510(u) may be replaced by difference information, which represents differences between a current software component (e.g. stored in the nonvolatile memory device 520 to be replaced by the updated software component) and the updated software component 510(u). It should be further noted that the memory controller 505 or any other suitable component of the device 500 may reconstruct the updated software component 510(u) based on the current software component and the difference information.

FIG. 5 illustrates the software update package 510(u) as including updated software booting metadata such as one or more updated FPD 512(u) and one or more updated boot headers 514(u), and updated software components such as one or more updated Linux kernels 517(u) and one or more updated CV/DL (Computer Vision/Deep Learning) kernels 515(u). Index (u) stands for updated (e.g. new). However, this is by way of example and not limitation, and the software update package 510(u) may include any suitable type of data, additional updated FPD data, additional updated boot header data, additional or alternative kernels, etc.

The nonvolatile memory (NVM) device 520 may be implemented as any suitable type of device and/or NVM memory, which may be of any suitable size, formatting, and/or addressable range. For instance, the NVM device 520 may be implemented as a component of the system 100 as discussed herein with respect to Section 1, or as any suitable type of device that may be implemented to store software or data that may be executed in accordance with a particular application for that particular device. In any event, the NVM device 520 may store current software booting metadata such as one or more FPD 522(c), one or more first boot headers 524(c, 1), one or more second boot headers 524(c, 2), and one or more current software components that are arranged in first software stack 518(c, 1) in first software stack 518(c, 1), and in second software stack 518(c,2). The first software stack 418(c,1) may include one or more (current) first Linux kernels 517(c,1), one or more (current) first root file systems 516(c,1), and one or more (current) first CV/DL kernels 515(c,1). Index c stands for current.

Figure 6A:
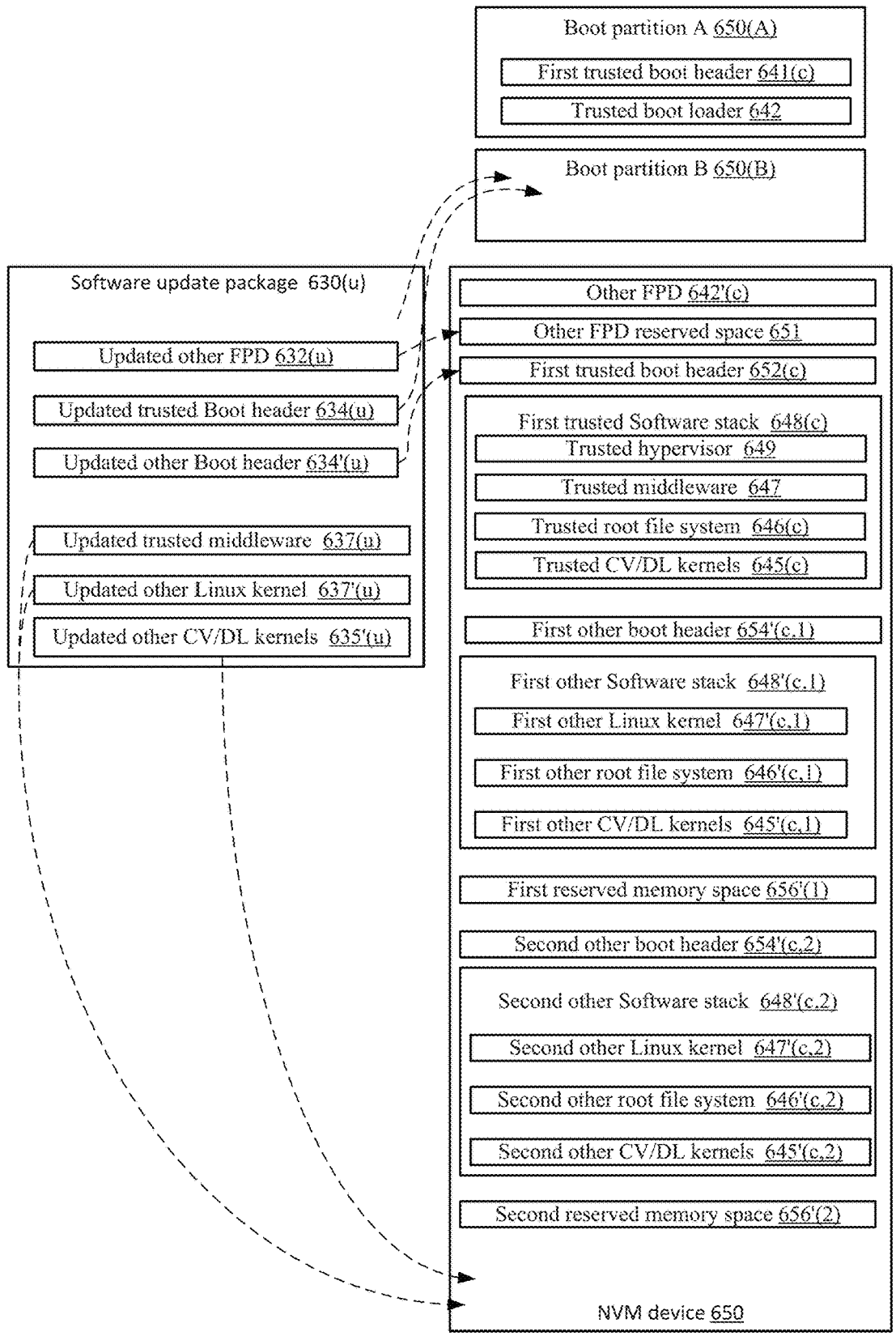
FIGS. 6A and 6B illustrate examples of a software update package and a nonvolatile memory device consistent with the disclosed embodiments.
Figure 6B:
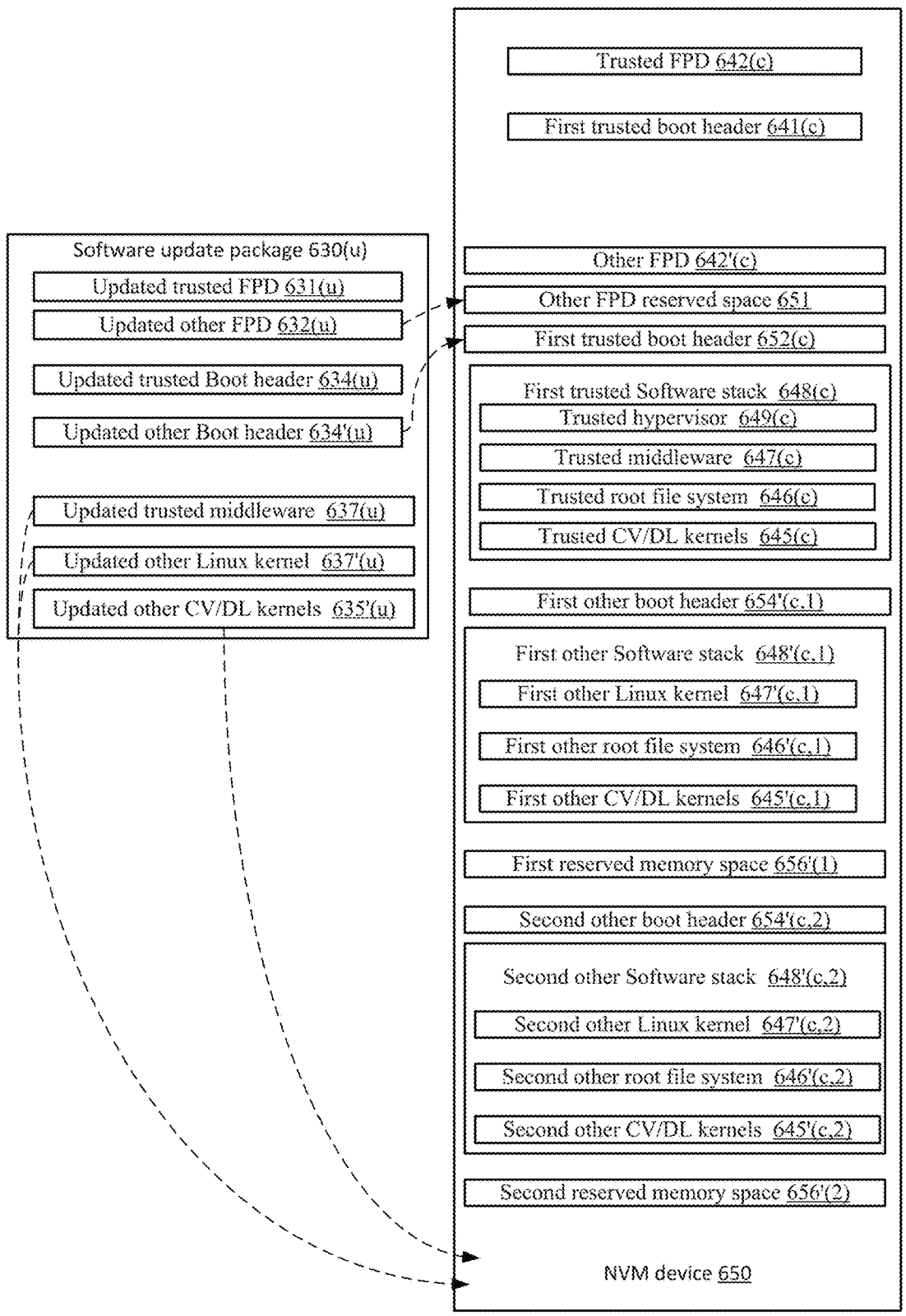

FIGS. 6A and 6B illustrate examples of a nonvolatile memory device 650 and a software update package 630(u), in accordance with the embodiments as discussed herein. For each of the examples as shown in FIGS. 6A and 6B, the software update package 630(u) may be identified with, for instance, trusted and/or further (i.e. second or other) updated software components as discussed herein. Moreover, for each of the examples as shown in FIGS. 6A and 6B, the software update package 630(u) may be received via the communication interface 501 as discussed above with respect to FIG. 5, and the memory controller 505 may likewise be configured to coordinate the reception of the software update package 630(u) and the provisioning of the software update package 630(u) to the security unit 503 and/or to the read/write manager 504 for writing the software update package 630(u) to the nonvolatile memory device 650. The use of the security unit 503 is optional in accordance with any of the embodiments described herein. Thus, the nonvolatile memory device 650 as shown in FIGS. 6A and 6B may be substantially similar or identical to the NVM device 520 as discussed above with reference to FIG. 5.

Thus, the examples shown in each of FIGS. 6A and 6B illustrate a software updating process for software components having different trust levels. However, the FIGS. 6A and 6B differ from each other by the allocation of specific partitions to the trusted software booting metadata in FIG. 6A, versus a lack of such an allocation in FIG. 6B. Moreover, in FIG. 6B, the trusted software metadata includes trusted FPDs, and in FIG. 6A the trusted software metadata may not include any trusted FPDs, as the location of the trusted boot headers is known (in boot partition A, i.e. 650A).

In both of the examples as shown in FIGS. 6A and 6B, at least some of the trusted boot headers may point to the other FPDs.

FIG. 6A illustrates the software update package 630(u) as including updated trusted FPD 632(u), updated trusted software booting metadata such as an updated trusted boot header 634(u), updated trusted software components such as updated trusted middleware 637(u), updated other software booting metadata such as updated other FPD 632(u), updated other boot headers 634'(u), and updated other software components such as updated other Linux kernel 637'(u) and updated other CV/DL kernels 635'(u). However, this is by way of example and not limitation, and the software update package 63(u) may include any suitable type of data, additional updated FPD data, additional trusted updated boot header data, additional or alternative trusted middleware, kernels, etc.

In the examples as shown in FIG. 6A, the nonvolatile memory device 650 stores, in a first boot partition (boot partition A 650(A)) a (current) first trusted boot header 641(c), and a trusted boot loader 642. The second boot partition (boot partition B 650(B)) is used to store the updated trusted software booting metadata (that may also include retrieval information for retrieving at least a part of the other software booting metadata).

In both of the examples as shown in FIGS. 6A and 6B, a third partition is used for storing current trusted software components (see first trusted software stack 648(c)), current other software components (see first and second other software stacks 648'(c, 1) and 648(c,2), respectively), and current other software booting metadata (such as other FPD 642'(c) and first and second other boot headers 648'(c,1) and 648'(c,2)).

EXAMPLES

The following examples pertain to further aspects.

An example (e.g. example 1) is a method for updating a trusted software and a further software, comprising: receiving, via one or more processors, a software update package that comprises (i) a trusted updated software component, (ii) a trusted updated software booting metadata, (iii) a further updated software component, and (iv) a further updated software booting metadata, wherein the trusted updated software component is identified with an updated version of the trusted software, the trusted software having a first trust level, wherein the further updated software component is identified with an updated version of the further software, the further software having a second trust level that is lower than the first trust level, wherein a part of the trusted updated software booting metadata comprises retrieval information for retrieving, during a booting process, a portion of the further software booting metadata; storing, via one or more processors at different respective memory locations of a memory, the trusted updated software component, the trusted updated software booting metadata, the further updated software component, and the further updated software booting metadata, the storing being executed without overwriting (i) a trusted current software component, (ii) a trusted current software booting metadata, (iii) a further current software component, and (iv) a further current software booting metadata, wherein the trusted current software component is identified with a current version of the trusted software, and the further current software component is identified with a current version of the further software; switching, via one or more processors, from the current version of the trusted software to the updated version of the trusted software; switching, via one or more processors, from the current version of the further software to the updated version of the further software; and invalidating, via one or more processors, the current trusted software booting metadata and the current further software booting metadata.

Another example (e.g. example 2) relates to a previously-described example (e.g. example 1) wherein at least part of the updated software booting metadata comprises boot headers that point to a part of the further software booting metadata.

Another example (e.g. example 3) relates to a previously-described example (e.g. one or more of examples 1-2), wherein the trusted updated software component comprises a trusted software partition descriptor and a trusted software boot header.

Another example (e.g. example 4) relates to a previously-described example (e.g. one or more of examples 1-3), wherein the further updated software component comprises a further software partition descriptor and a further software boot header.

Another example (e.g. example 5) relates to a previously-described example (e.g. one or more of examples 1-4), wherein the trusted updated software component comprises a trusted software boot header and does not include a trusted software partition descriptor.

Another example (e.g. example 6) relates to a previously-described example (e.g. one or more of examples 1-5), further comprising: storing the trusted updated software component and the further updated software component in different respective partitions of the memory.

Another example (e.g. example 7) relates to a previously-described example (e.g. one or more of examples 1-6), further comprising: applying a security measure to the software update package; and preventing, when the security measure is indicative of a security breach, storing of the software update package in the memory.

Another example (e.g. example 8) relates to a previously-described example (e.g. one or more of examples 1-7), further comprising: storing, in the memory, multiple repetitions of the trusted updated software component, the trusted updated software booting metadata, the further updated software component, and the further updated software booting metadata.

Another example (e.g. example 9) relates to a previously-described example (e.g. one or more of examples 1-8), further comprising: storing the trusted updated software booting metadata in a reserved location in the memory positioned between (i) a first memory range allocated to a first current software component boot header and to a first current software component, and (ii) a second memory range allocated to a second current software component boot header and to a second current software component.

Another example (e.g. example 10) relates to a previously-described example (e.g. one or more of examples 1-9), wherein the storing of the trusted updated software booting metadata in the reserved location of the memory is followed by storing, in the second memory range, the updated software component.

An example (e.g. example 11) is a non-transitory computer readable medium configured to store instructions that, when executed by one or more processors, cause the one or more processors to: receive a software update package that comprises (i) a trusted updated software component, (ii) a trusted updated software booting metadata, (iii) a further updated software component, and (iv) a further updated software booting metadata, wherein the trusted updated software component is identified with an updated version of the trusted software, the trusted software component having a first trust level, wherein the further updated software component is identified with an updated version of the further software, and the further software component is identified with a second trust level that is lower than the first trust level, wherein at least a part of the updated software booting metadata comprises retrieval information for retrieving, during a booting process, a portion of the further software booting metadata; storing, at different respective locations of a memory, the trusted updated software component, the trusted updated software booting metadata, the further updated software component, and the further updated software booting metadata, the storing being executed without overwriting (i) a trusted current software component, (ii) a trusted current software booting metadata, (iii) a further current software component, and (iv) a further current software booting metadata, wherein the trusted current software component is identified with a current version of the trusted software, and the further current software component is identified with a current version of the further software; switching from the current version of the trusted software to the updated version of the trusted software; switching from the current version of the further software to the updated version of the further software; and invalidating the current trusted software booting metadata and the current further software booting metadata.

Another example (e.g. example 12) relates to a previously-described example (e.g. example 11), wherein part of the updated software booting metadata comprises boot headers that point to a part of the further software booting metadata.

Another example (e.g. example 13) relates to a previously-described example (e.g. one or more of examples 11-12), wherein the trusted updated software component comprises a trusted software partition descriptor and a trusted software boot header.

Another example (e.g. example 14) relates to a previously-described example (e.g. one or more of examples 11-13), wherein the other updated software component comprises a further software partition descriptor and a further software boot header.

Another example (e.g. example 15) relates to a previously-described example (e.g. one or more of examples 11-14), wherein the trusted updated software component comprises a trusted software boot header and does not include a trusted software partition descriptor.

Another example (e.g. example 16) relates to a previously-described example (e.g. one or more of examples 11-15), wherein the instructions, when executed by one or more processors, further cause the one or more processors to store the trusted updated software component and the further updated software component in different respective partitions of the memory.

Another example (e.g. example 17) relates to a previously-described example (e.g. one or more of examples 11-16), wherein the instructions, when executed by one or more processors, further cause the one or more processors to apply a security measure to the software update package and to prevent, when the security measure is indicative of a security breach, storing of the software update package in the memory.

Another example (e.g. example 18) relates to a previously-described example (e.g. one or more of examples 11-17), wherein the instructions, when executed by one or more processors, further cause the one or more processors to store, in the memory, multiple repetitions of the trusted updated software component, the trusted updated software booting metadata, the further updated software component, and the further updated software booting metadata.

Another example (e.g. example 19) relates to a previously-described example (e.g. one or more of examples 11-18), wherein the instructions, when executed by one or more processors, further cause the one or more processors to store the trusted updated software booting metadata in a reserved location of the memory positioned between (i) a first memory range allocated to a first current software component boot header and to a first current software component, and (ii) a second memory range allocated to a second current software component boot header and to a second current software component.

Another example (e.g. example 20) relates to a previously-described example (e.g. one or more of examples 11-19), wherein the instructions, when executed by one or more processors, cause the one or more processors to store the trusted updated software booting metadata in the reserved location of the memory followed by storing the updated software component in the second memory range.

An example (e.g. example 21) relates to a system, comprising: a communication interface; a memory controller communicatively coupled to the communication interface; and a non-volatile memory device, wherein the memory controller is configured to: receive, via the communication interface, a software update package that comprises (i) a trusted updated software component, (ii) a trusted updated software booting metadata, (iii) a further updated software component, and (iv) a further updated software booting metadata, wherein the trusted updated software component is identified with an updated version of a trusted software, the trusted software having a first trust level, wherein the further updated software component is identified with an updated version of a further software, the further software having a second trust level that is lower than the first trust level, wherein a part of the updated software booting metadata comprises retrieval information for retrieving, during a booting process, a portion of the further software booting metadata; store, at different respective locations of a memory, the trusted updated software component, the trusted updated software booting metadata, the further updated software component, and the further updated software booting metadata, wherein the storing is executed without overwriting (i) a trusted current software component, (ii) a trusted current software booting metadata, (iii) a further current software component, and (iv) a further current software booting metadata, wherein the trusted current software component is identified with a current version of the trusted software, and the further current software component is identified with a current version of the other software; receive an instruction to switch from the current version of the trusted software to the updated version of the trusted software; receive an instruction to switch from the current version of the further software to the updated version of the further software; and invalidate the current trusted software booting metadata and the current further software booting metadata.

A method as shown and described.

An apparatus as shown and described.

CONCLUSION

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present disclosure may for the most part, be implemented using electronic components and circuits known to those skilled in the art, details will not be explained in any greater extent than that considered necessary as illustrated above, for the understanding and appreciation of the underlying concepts of the present disclosure and in order not to obfuscate or distract from the teachings of the present disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the embodiments described in the specification and/or any claims may be provided. Especially any combination of any claimed feature may be provided.

A pixel may be a picture element obtained by a camera, and may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image based or is not exclusively image based, as well.

Any reference to any of the terms "comprise", "comprises", "comprising" "including", "may include" and "includes" may be applied to any of the terms "consists", "consisting", "and consisting essentially of". For example—any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The disclosure may also be implemented in a computer program for running on a computer system, at least including code portions for performing steps of a method according to the disclosure when run on a programmable apparatus, such as a computer system or enabling a programmable apparatus to perform functions of a device or system according to the disclosure. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the disclosure has been described with reference to specific examples of embodiments of the disclosure. It will, however, be evident that various modifications and changes may be made therein without departing from the broader spirit and scope of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one, or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A method for updating a trusted software and a further software, comprising:
   receiving, via one or more processors, a software update package,
   wherein a trusted updated software component of the software update package is identified with an updated version of the trusted software, the trusted software having a first trust level,
   wherein a further updated software component is identified with an updated version of the further software, the further software having a second trust level that is lower than the first trust level,
   storing, via one or more processors at different respective memory locations of a memory, the trusted updated software component, a trusted updated software booting metadata, the further updated software component, and a further updated software booting metadata, the storing being executed without overwriting (i) a trusted current software component, (ii) a trusted current software booting metadata, (iii) a further current software component, and (iv) a further current software booting metadata,
   switching, via one or more processors, from a current version of the trusted software to the updated version of the trusted software;
   switching, via one or more processors, from a current version of the further software to the updated version of the further software; and
   invalidating, via one or more processors, the trusted current software booting metadata and the further current software booting metadata.

2. The method according to claim 1, wherein the software update package comprises (i) the trusted updated software component, (ii) the trusted updated software booting metadata, (iii) the further updated software component, and (iv) the further updated software booting metadata.

3. The method according to claim 1, wherein a part of the trusted updated software booting metadata comprises retrieval information for retrieving, during a booting process, a portion of the further updated software booting metadata.

4. The method according to claim 1, wherein the trusted current software component is identified with a current version of the trusted software, and the further current software component is identified with a current version of the further software.

5. The method according to claim 1, wherein at least part of the trusted updated software booting metadata comprises boot headers that point to a part of the further updated software booting metadata.

6. The method according to claim 1, wherein the trusted updated software component comprises a trusted software partition descriptor and a trusted software boot header.

7. The method according to claim 1, wherein the further updated software component comprises a further software partition descriptor and a further software boot header.

8. The method according to claim 1, wherein the trusted updated software component comprises a trusted software boot header and does not include a trusted software partition descriptor.

9. The method according to claim 1, further comprising:
storing the trusted updated software component and the further updated software component in different respective partitions of the memory.

10. The method according to claim 1, further comprising:
applying a security measure to the software update package; and
preventing, when the security measure is indicative of a security breach, storing of the software update package in the memory.

11. The method according to claim 1, further comprising:
storing, in the memory, multiple repetitions of the trusted updated software component, the trusted updated software booting metadata, the further updated software component, and the further updated software booting metadata.

12. The method according to claim 1, further comprising:
storing the trusted updated software booting metadata in a reserved location in the memory positioned between (i) a first memory range allocated to a first current software component boot header and to a first current software component, and (ii) a second memory range allocated to a second current software component boot header and to a second current software component,
wherein the storing of the trusted updated software booting metadata in the reserved location of the memory is followed by storing, in the second memory range, the updated software component.

13. A non-transitory computer readable medium configured to store instructions that, when executed by one or more processors, cause the one or more processors to update a trusted software and a further software by:
receiving a software update package,
wherein a trusted updated software component of the software update package is identified with an updated version of the trusted software, the trusted software component having a first trust level,
wherein a further updated software component is identified with an updated version of the further software, and the further software component is identified with a second trust level that is lower than the first trust level,
storing, at different respective locations of a memory, the trusted updated software component, a trusted updated software booting metadata, the further updated software component, and a further updated software booting metadata, the storing being executed without overwriting (i) a trusted current software component, (ii) a trusted current software booting metadata, (iii) a further current software component, and (iv) a further current software booting metadata,
switching from a current version of the trusted software to the updated version of the trusted software;
switching from a current version of the further software to the updated version of the further software; and
invalidating the trusted current software booting metadata and the further current software booting metadata.

14. The non-transitory computer readable medium according to claim 13, wherein the software update package comprises (i) the trusted updated software component, (ii) the trusted updated software booting metadata, (iii) the further updated software component, and (iv) the further updated software booting metadata.

15. The non-transitory computer readable medium according to claim 13, wherein a part of the trusted updated software booting metadata comprises retrieval information for retrieving, during a booting process, a portion of the further updated software booting metadata.

16. The non-transitory computer readable medium according to claim 13, wherein the trusted current software component is identified with a current version of the trusted software, and the further current software component is identified with a current version of the further software.

17. The non-transitory computer readable medium according to claim 13, wherein part of the trusted updated software booting metadata comprises boot headers that point to a part of the further updated software booting metadata.

18. The non-transitory computer readable medium according to claim 13, wherein the trusted updated software component comprises a trusted software partition descriptor and a trusted software boot header.

19. The non-transitory computer readable medium according to claim 13, wherein the further updated software component comprises a further software partition descriptor and a further software boot header.

20. The non-transitory computer readable medium according to claim 13, wherein the trusted updated software component comprises a trusted software boot header and does not include a trusted software partition descriptor.

21. The non-transitory computer readable medium according to claim 13, wherein the instructions, when executed by one or more processors, further cause the one or more processors to store the trusted updated software component and the further updated software component in different respective partitions of the memory.

22. The non-transitory computer readable medium according to claim 13, wherein the instructions, when executed by one or more processors, further cause the one or more processors to apply a security measure to the software update package and to prevent, when the security measure is indicative of a security breach, storing of the software update package in the memory.

23. The non-transitory computer readable medium according to claim 13, wherein the instructions, when executed by one or more processors, further cause the one or more processors to store, in the memory, multiple repetitions of the trusted updated software component, the trusted updated software booting metadata, the further updated software component, and the further updated software booting metadata.

24. The non-transitory computer readable medium according to claim 13, wherein the instructions, when executed by one or more processors, further cause the one or more processors to:
store the trusted updated software booting metadata in a reserved location of the memory positioned between (i) a first memory range allocated to a first current software component boot header and to a first current software component, and (ii) a second memory range allocated to a second current software component boot header and to a second current software component; and
store the trusted updated software booting metadata in the reserved location of the memory followed by storing the updated software component in the second memory range.

* * * * *